US012750299B2

(12) United States Patent
Ganesan et al.

(10) Patent No.: US 12,750,299 B2
(45) Date of Patent: Sep. 29, 2026

(54) SYSTEMS AND METHODS FOR INCREASING NETWORK RESOURCE UTILIZATION IN LINK AGGREGATION GROUP (LAG) DEPLOYMENTS

(71) Applicant: DELL PRODUCTS L.P., Round Rock, TX (US)

(72) Inventors: Senthil Kumar Ganesan, San Ramon, CA (US); Udhaya Chandran Shanmugam, Santa Clara, CA (US); Kannan Karuppiah, Fremont, CA (US)

(73) Assignee: DELL PRODUCTS L.P., Round Rock, TX (US)

(*) Notice: Subject to any disclaimer, the term of this patent is extended or adjusted under 35 U.S.C. 154(b) by 571 days.

(21) Appl. No.: 17/868,530

(22) Filed: Jul. 19, 2022

(65) Prior Publication Data

US 2024/0031272 A1 Jan. 25, 2024

(51) Int. Cl.

| | |
|---|---|
| ***H04W 12/037*** | (2021.01) |
| ***H04L 45/02*** | (2022.01) |
| ***H04L 45/12*** | (2022.01) |
| ***H04L 45/16*** | (2022.01) |
| ***H04L 45/24*** | (2022.01) |

(52) U.S. Cl.

CPC ............ *H04L 45/02* (2013.01); *H04L 45/127* (2013.01); *H04L 45/16* (2013.01); *H04L 45/245* (2013.01)

(58) Field of Classification Search

CPC ........ H04L 45/02; H04L 45/127; H04L 45/16; H04L 45/245

USPC .......................................................... 370/392

See application file for complete search history.

(56) References Cited

U.S. PATENT DOCUMENTS

| | | | | |
|---|---|---|---|---|
| 6,385,201 | B1 * | 5/2002 | Iwata | H04L 49/3081 370/255 |
| 9,385,942 | B2 * | 7/2016 | Grosser, Jr. | H04L 41/12 |
| 12,106,160 | B2 * | 10/2024 | Malhotra | H04L 45/586 |
| 2013/0336117 | A1 * | 12/2013 | Yan | H04J 3/0667 370/235 |
| 2014/0307540 | A1 * | 10/2014 | Duda | H04L 41/082 370/220 |
| 2016/0036728 | A1 * | 2/2016 | Duda | H04L 49/25 370/357 |
| 2017/0163473 | A1 * | 6/2017 | Sadana | H04L 47/41 |
| 2018/0302315 | A1 * | 10/2018 | Kamisetty | H04L 12/462 |
| 2019/0253381 | A1 * | 8/2019 | Ji | H04L 49/557 |
| 2022/0006719 | A1 * | 1/2022 | Barry | H04L 45/48 |
| 2023/0031683 | A1 * | 2/2023 | He | H04L 12/4645 |

FOREIGN PATENT DOCUMENTS

| | | | | |
|---|---|---|---|---|
| WO | WO 2020/041742 | * | 2/2020 | H04L 29/12 |
| WO | WO-2020041742 A1 | * | 2/2020 | H04L 29/12 |

* cited by examiner

*Primary Examiner* — Christopher M Crutchfield
*Assistant Examiner* — Syed Ahmed
(74) *Attorney, Agent, or Firm* — BAUGH LAW, LLC

(57) ABSTRACT

Systems and methods communicate to a primary peer node a message that indicates that a secondary peer node does not comprise an orphan port or a link that is operationally down. In various embodiments, this causes the primary node to not send broadcast, unknown unicast, or multicast (BUM) traffic to the secondary peer node such as to prevent that traffic from being unnecessarily dropped at the peer node, thus, conserving computing resources, such as an internode link bandwidth, and significantly improving overall network performance.

20 Claims, 7 Drawing Sheets

100

500

SYSTEMS AND METHODS FOR INCREASING NETWORK RESOURCE UTILIZATION IN LINK AGGREGATION GROUP (LAG) DEPLOYMENTS

BACKGROUND

A. Technical Field

The present disclosure relates generally to information handling systems. More particularly, the present disclosure relates to systems and methods that increase network resource utilization in LAG topologies.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In existing virtual LAG (VLAG) deployments, VLAG peer nodes such as network switches communicatively coupled over an internode link (INL) oftentimes flood each other's CPUs with data plane traffic that is eventually dropped at the peer node. Such flooding unnecessarily consumes switch resources and degrades overall network performance.

Accordingly, it is highly desirable to find new, more efficient systems and methods to utilize network processing units (NPUs) to conserve INL bandwidth and optimize computing resources to improve switch performance and, thus, network performance.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments.

DETAILED DESCRIPTION OF EMBODIMENTS

Figure 1:
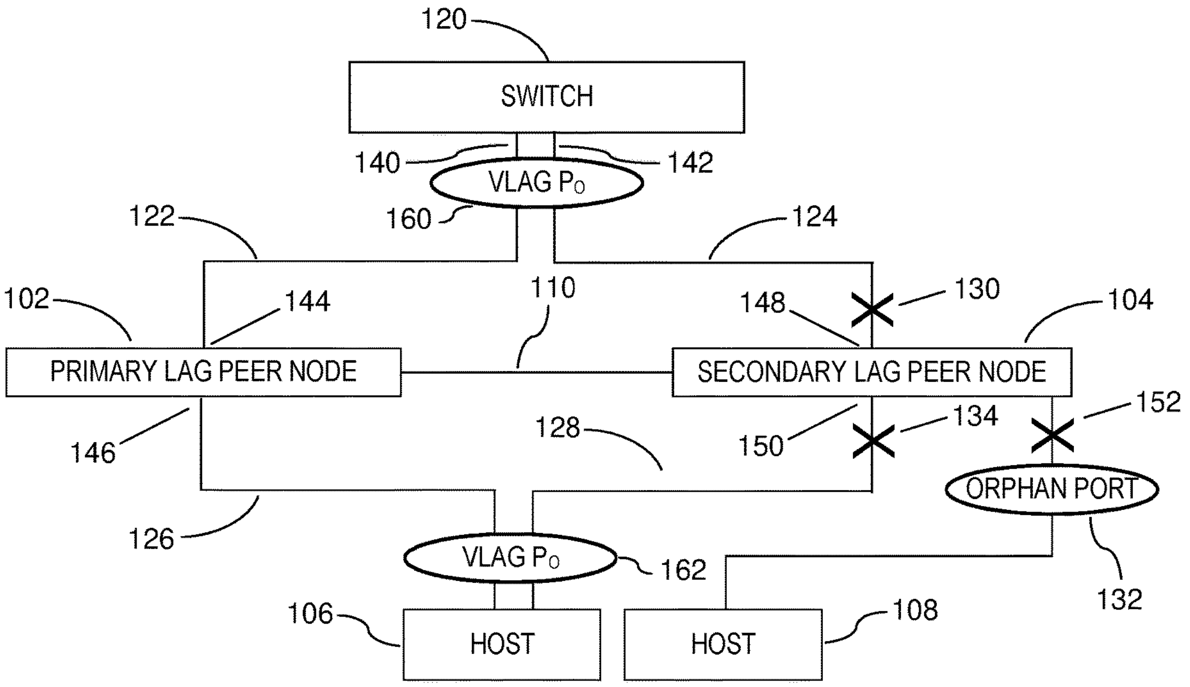
FIG. 1 depicts a network topology comprising primary and secondary LAG peer nodes and an orphan port, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably.

In this document, the terms "packet" or "frame" shall be understood to mean a group of one or more bits. The term "frame" shall not be interpreted as limiting embodiments of the present invention to Layer 2 networks; and the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The terms "VLT," "trunk," "trunk link," "LAG," and "VLAG" may be used interchangeably. Similarly, the terms "BUM traffic" and "user traffic" may be used interchangeably. The term "up" refers to "operationally up," "active," or "operational." Similarly, the term "down" refers to "operationally down," "inactive," or "not operational." The terms "optimal," "optimize," "optimization," and the like refer to an improvement of an outcome or a process and do not require that the specified outcome or process has achieved an "optimal" or peak state.

It is noted that although embodiments described herein may be within the context of network switches, aspects of the present disclosure are not so limited. Accordingly, the aspects of the present disclosure may be applied or adapted for use in other contexts.

FIG. 1 depicts a network topology, according to embodiments of the present disclosure in which the ports of a secondary VLAG node that comprises an orphan port are operationally down. In one or more embodiments, VLAG topology 100 comprises primary peer node 102, secondary peer node 104, switch 120, and hosts 106, 108. As depicted, each of switch 120 and host 106 comprises respectively VLAG port channels 160 and 162 (denoted VLAG Po).

It is noted that in FIG. 1 each depicted link may represent any number of links. It is further noted that, in forming a LAG system, primary and secondary peer nodes 102, 104 may be connected via one or more links 110 that may be referred to by the terms inter-node links (INL), inter-chassis links (ICLs), or virtual link trunk interconnect (VLTi), which may be used interchangeably herein. These links may be used to connect the peer nodes 102, 104 to form the LAG system that acts with other network devices (e.g., switch 120 and hosts 106, 108). INLs typically carry packets according to control protocols using a mechanism that synchronizes the operation of peer nodes, for example by synchronizing VLAG information that determines which ports should block traffic under certain circumstances.

In regular operation, in existing VLAG designs, switch 120 uses VLAG port channel 160 to communicate traffic to either primary peer node 102 or secondary peer node 104 using respective ports 140 and 142. In instances where the destination of traffic ingressing on 102 is unknown, e.g., broadcast, unknown unicast, or multicast (BUM) traffic, primary peer node 102 floods that traffic onto both link 146 and INL 110. Similarly, secondary peer node 104 floods such traffic onto orphan port 132. However, since primary and secondary peer nodes 102, 104 are coupled to the same VLAG port channel 162, secondary peer node 104 will drop such traffic instead of sending it downstream on link 134 to avoid duplication or, stated differently, to avoid that host 106 receives the same traffic from both primary and secondary LAG nodes 102 and 104. Dropping of packets that traverse INL 110 is achieved, e.g., via the Egress Mask feature supported by the NPU.

When secondary peer node 104 is in a startup phase, e.g., when undergoing a boot or reboot, BUM traffic sent by primary peer node 102, via INL 110, will cause unwanted flooding of secondary peer node 104 as primary peer node 102 will continue to use INL 110 to send control traffic and BUM traffic, which is eventually dropped at secondary peer node 104 with no regard as to the operational status of secondary peer node 104 and its ports.

As a result, unnecessary data plane traffic that floods secondary peer node 104 is dropped at its CPU, contributing to switch CPU overload. Since during this phase ports 130, 134, and 152 of secondary peer node 104 are down and inoperable, as indicated by the symbol "X" in FIG. 1, the CPU of the secondary peer node 104 will after consuming resources such as memory and bandwidth nevertheless drop packets and cause excessive processing delays in bringing up the control plane and in programming the data plane, thus, introducing delays in the switch response and delaying network convergence. Especially in scaled environments, performance degradation is exacerbated and amplified multiple fold.

Figure 2:
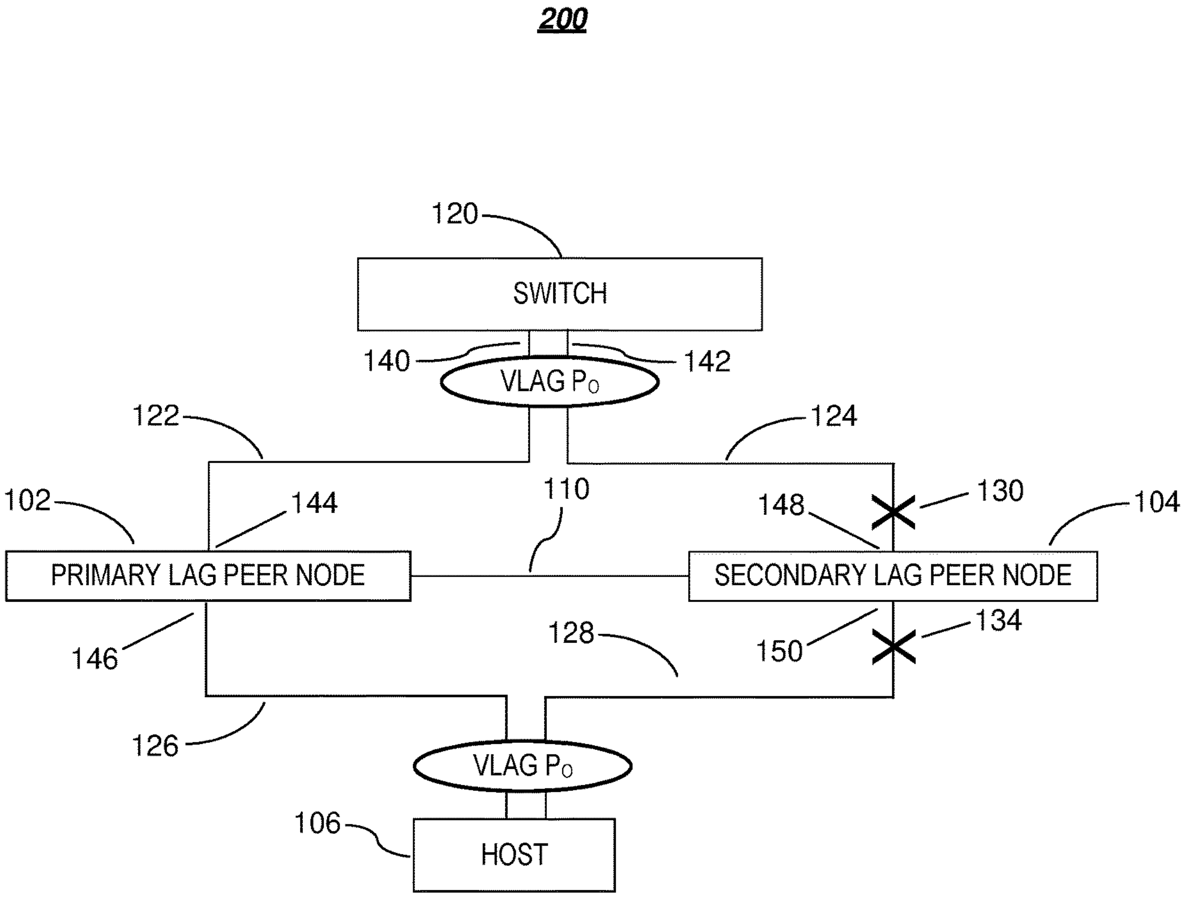
FIG. 2 depicts a network topology that has no orphan port, according to embodiments of the present disclosure.

In orphan port-free LAG topologies, such as that shown in FIG. 2, if the ports of both peer nodes 102, 104 are operationally up, in existing systems, similar to the topology in FIG. 1, BUM traffic will be unnecessarily sent to secondary peer node 104, processed by its CPU, and eventually dropped. While orphan port-free VLAG topologies are more prevalent in deployments, as they tend to better satisfy high availability requirements, once primary peer node 102 floods BUM traffic to secondary peer node 104 via INL 110, secondary peer node 104 will use logic to block or drop packets in the data plane to prevent possible duplication. Again, such flooding consumes excessive switch resources that degrades switch performance.

Therefore, it is desirable to have mechanisms to synchronize information between LAG peer nodes, e.g., to communicate the presence of orphan ports such as to enable peer nodes to determine whether to block BUM traffic from traversing INL 110 and conserve valuable hardware and processing resources, including buffer resources at switch ports, available link bandwidth, CPU resources, etc., and when to enable BUM traffic.

Accordingly, in one or more embodiments, to preserve computing resources on primary peer node 102 and/or secondary peer node 104, nodes may exchange control messages comprising one or more timing-related commands with each other. As an example, once primary peer node 102 receives a control message indicating that secondary peer node 104 is in a boot or startup phase, primary peer node 102 may install or implement a hardware rule that, for the duration of that phase, prevents primary peer node 102 from sending or exchanging over INL 110 packets other than control traffic packets, discussed below, or packets that did not originate at primary peer node 102 itself.

In detail, in one or more embodiments, prior to exchanging control messages, configuration parameters and/or control messages may be defined, e.g., as part of a VLAG discovery process. It is understood that the discovery process may be used to allocate to nodes roles of "primary" and "secondary," for example, after a user configures one of the ports on each switch as an INL port. Configuration parameters may comprise priority information, which may be used to commence an election process that identifies to which switch to assign the respective roles of primary and secondary.

In one or more embodiments, once the discovery process is complete and primary peer node 102 and secondary peer node 104 have been assigned their respective roles, an exchange protocol may cause each peer node to exchange control messages or commands over INL 110, e.g., to obtain status information regarding whether a peer device comprises an orphan port and/or whether the peer device is in the process of rebooting. For example, node 104 may, without user intervention, communicate to the media access control (MAC) address of primary peer node 102 information associated with a timer or delay timer with which secondary peer node 104 has been configured and which indicates that secondary peer node 104 is in the process of rebooting, i.e., its ports are down.

In one or more embodiments, to conserve computing resources, status information may comprise timing information such as information about when the timer has been started or how long a timer will count before expiring, and the like. For example, an exemplary control message config_delay_restore_timer_msg may be used to exchange a configured delay restore timer between LAG peer nodes and, once the configured delay timer expires, an exemplary message config_delay_restore_timer_expiry_msg may be sent to a LAG peer node. The control message may comprise commands to start sending traffic or stop sending traffic. As discussed in greater detail below, a suitable control message may further comprise information about the presence of any orphan ports on secondary peer node 104. In one or more embodiments, to prevent CPU overload, and the like, once secondary peer node 104 is in the process of rebooting, primary peer node 102 may be asked to not send any non-control traffic over INL 110 for a time period reflecting a boot time, e.g., until the delay restore timer in secondary peer node 104 expires.

In one or more embodiments, the control message, together with existing control messages such as vlt_port_channel_status_msg and spanned_vlan_config_msg, may be used to determine whether to send BUM traffic and/or control plane traffic to a LAG peer node. It is understood that the roles of primary peer node 102 and secondary peer node 104 may be reversed depending on which switch is performing a boot operation at a given moment. For example, once secondary peer node 104 is in normal operation but primary peer node 102 goes down, e.g., requiring a reboot, secondary peer node 104 may be treated as the primary peer node.

As indicated in FIG. 2, in one or more embodiments, a node (e.g., 104) that has no orphan port, e.g., because its orphan port has been removed, or whose downlink(s) (e.g., 152) are operationally down, may automatically communicate its status regarding the lack of an orphan port in a control message to primary peer node 102, e.g., in a status flag, to indicate that primary peer node 102 should not send data traffic to secondary peer node 104 over INL 110. For example, a control message orphan_port_status_msg may be used to exchange a flag indicating whether an orphan port is present at the peer node.

In one or more embodiments, in response to receiving the control message, primary peer node 102 may install (or reinstall) a set of hardware rules that cause primary peer node 102 to not send/exchange data packets over INL 110 that did not originate at primary peer node 102, again, to preserve limited computing resources, which may be reallocated elsewhere as needed.

In one or more embodiments, once an orphan port is added to secondary peer node 104, secondary peer node 104 may use a control message to automatically communicate this change in status to primary peer node 102 to indicate that primary peer node 102 may resume using INL 110 to send data traffic to secondary peer node 104. A person of skill in the art will appreciate that any device to which an orphan port is added may send an appropriate status message to a peer device to announce a status change to cause the peer device to use INL 110 to send data traffic. Therefore, in scenarios in which an orphan port is added to primary peer node 102, primary peer node 102 may communicate to secondary peer node 104 a control message that reflects the peer status of primary peer node 102 and causes secondary peer node 104 to use INL 110 to send data traffic to primary peer node 102.

It is noted that while data traffic may be prevented from traversing INL 110, a set of hardware rules may be configured in a way such as to not affect the flow of control plane protocol packets that may be sent, e.g., based on system flow entries in the ingress field processor (IFP). As a result, control traffic may still traverse INL 110, e.g., to maintain proper control functions. Exemplary control traffic packets that may continue to traverse INL 110 and be forwarded upstream or downstream comprise Open Shortest Path First (OSPF), Border Gateway Protocol (BGP) control plane access control list (ACL) entries, Address Resolution Protocol (ARP), Internet Control Message Protocol (ICMP), Neighbor Discovery (ND) Protocol, etc., corresponding to various control protocols. Conversely, other exemplary packets that may be prevented from traversing INL 110 may comprise ARP packets, Dynamic Host Configuration Protocol (DHCP) packets, and Domain Name System (DNS) packets. It shall be noted, however, which control traffic is blocked and which is allowed may be defined by a user; as explained in more detail below, traffic that is desired to be blocked may be tagged with a class identifier on ingress, and a corresponding egress rule(s) may block all traffic with that class identifier.

In one or more embodiments, the system determines whether ingressed packets may or may not traverse INL 110 based on the presence of a set of egress drop rules or policies that may be applied, e.g., according to each type of packet or protocol. Packets that are not permitted to traverse INL 110 may be dropped in the egress pipeline. In one or more embodiments, such packets may be tagged with a class identifier, e.g., an I2E class-id supported by the IFP. The identifier, e.g., a numerical unit, may be added to the protocol field processor entry that controls an action and may be validated in the egress pipeline in EFP (Ethernet Flow Point).

In one or more embodiments, in the ingress pipeline, the entry protocol field or ethertype may be used as a qualifier that defines an action that may comprise applying the I2E class-id to a packet according to the egress drop rule. In one or more embodiments, in the egress pipeline, a qualifier associated with the INL port as the egress port may be processed according to the I2E class-id that was set by the ingress pipeline to perform an action such as dropping a packet to prevent the tagged packet from traversing INL 110. It is understood that, in one or more embodiments, instead of tagging non-permitted traffic, permitted traffic may be equally tagged.

Presented below is an embodiment of ingress pipeline and egress pipeline for an information handling system node, given that the node supports use of identifiers (e.g., the node comprises IFP/IFP functionality to add an identifier (e.g., classid (I2E)) as one of the actions), and comprises EFP/EFP functionality that validates the identifier in the egress pipeline. In one or more embodiments, a class identifier (e.g., I2E) is added to the protocol FP entry which is not needed in another LAG peer node (e.g., ARP, DHCP, DNS, etc.), and a class identifier is not added for other control traffic (e.g., OSPF, BGP, control plane ACL Entry, etc.) so that it may traverse via INL to the other peer node:

```
In Ingress Pipeline:
  Qualifier:
    Protocol field/ethertype.
  Action :
    Existing action + I2E Class-id
In Egress Pipeline:
  Qualifier will be:
    Egress port: INL Port
    I2E Class Id: set by Ingress pipeline.
  Action :
    Drop
```

It shall be noted that one or more ingress and egress rules may be set, and one or more class identifiers may be used (and for different treatments). Overall, unnecessary flooding of devices with traffic that would ultimately be dropped may thus be avoided, advantageously saving system resources, including bandwidth and CPU resources.

Figure 3:
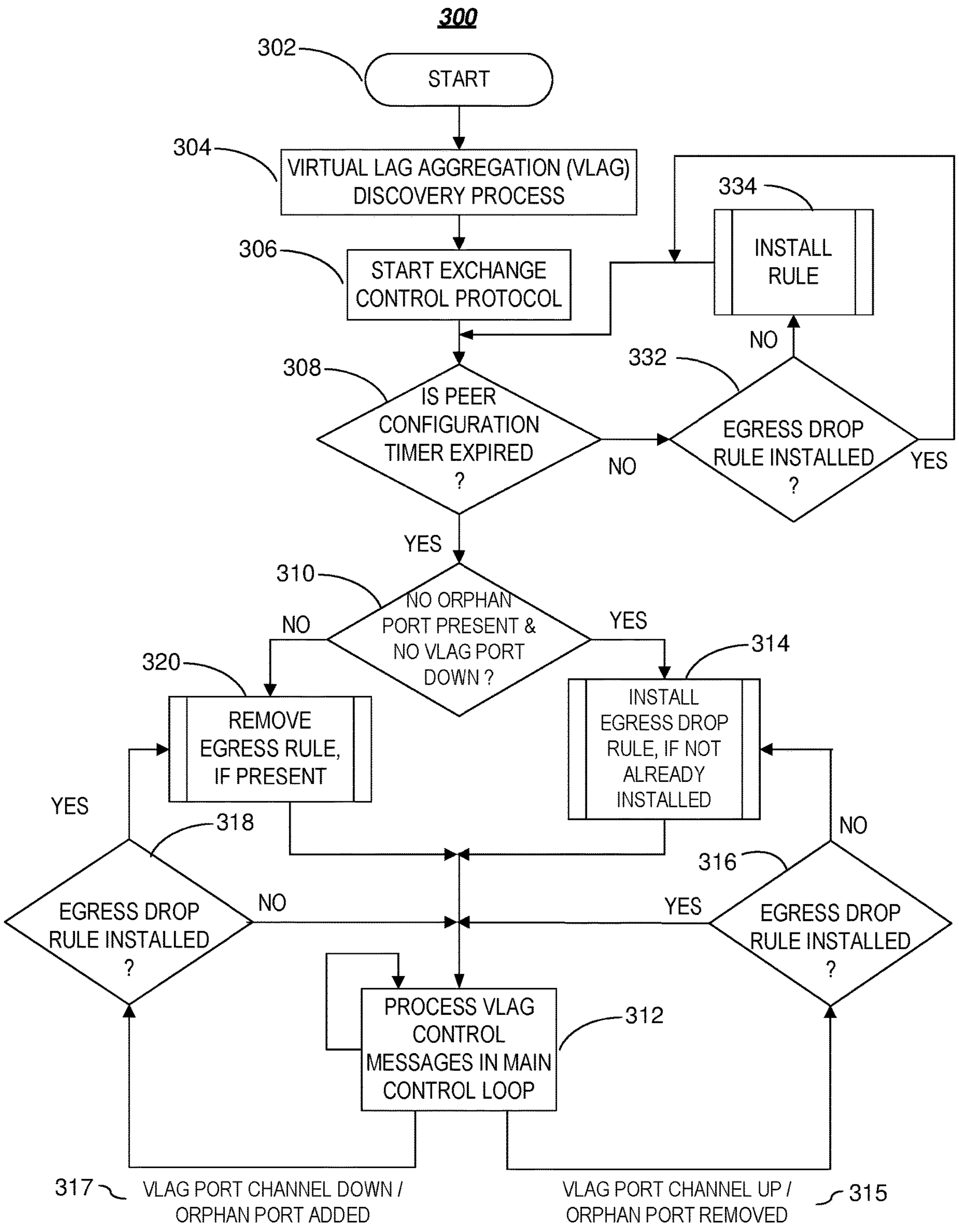
FIG. 3 is a flowchart of an illustrative control process according to various embodiments of the present disclosure.

FIG. 3 is a flowchart of an illustrative control process according to various embodiments of the present disclosure. It shall be noted that the methodology of FIG. 3 may be performed, in one or more embodiments, by each of the peer nodes. By way of terminology for sake of clarity, the node performing the methodology will be referred to below as the node and a peer node will be referred to below as the peer node. Using FIG. 2 by way of example, when discussing the primary node 102 performing the method of FIG. 3, it is referred to as "the node" and the secondary peer node 104 is referred to as "the peer node." Similarly, if discussing the secondary peer node 104 performing the method of FIG. 3, it would be "the node" and the primary peer node 102 would be "the peer node."

In one or more embodiments, control process 300 may start (302), for example, by starting a VLAG discovery process (304) and an exchange protocol (306). In one or more embodiments, a first node (e.g., primary node) may determine (308), based on a control message received from a peer node (e.g., a secondary peer node) over an INL, whether a configuration timer associated with the secondary peer node has expired. It shall be noted that, in one or more embodiments, the length of the timer may be pre-set (e.g., 90 seconds), system defined, and/or user defined.

In one or more embodiments, if the configuration timer associated with the peer node has not expired, a determination is made (332) whether the egress drop rule (e.g., an egress drop rule, which may be implemented as an egress access control list (ACL), that causes the node to refrain from sending certain traffic (i.e., BUM data traffic and, depending upon the embodiment, some control traffic) over the INL to the other peer node) is installed on the node. If the egress drop rule has not been installed, the node installs (334) it. If the egress drop rule has been installed, no additional action need be taken. And as illustrated, in either event, the overall process continues checking whether a configuration timer associated with the secondary peer node has expired.

Step 308 contemplates situations when a peer node is restarting and cannot handle receipt of traffic. In situations in which the peer node is not restarting (i.e., it is operational), its configuration timer will have expired and it will report such. For example, if a secondary node is restarting, the primary node will check for when the secondary node's configuration time has expired; however, when the secondary node is operational and performs the methodology of FIG. 3, the primary node will return, upon first inquiry, that its configuration timer has expired.

Returning to FIG. 3, if a configuration timer for a peer node has expired, the node may further determine (310) whether there is an orphan port present on the peer node or a LAG port is down.

In one or more embodiments, if there are no orphan ports and no VLAG port is down, then the node installs (314) the egress drop rule (if it is not already installed). As noted above, such an egress drop rule causes the node to refrain from sending at least BUM traffic over the INL—as noted previously, in one or more embodiments, the rule may also include dropping at least some of the control traffic. Otherwise, if the peer node is coupled to an orphan port or there is a VLAG port down, the node may remove (320) the egress rule (if it is present).

In either case, the node then proceeds to process (312) VLAG control messages and data traffic in a main control loop, until either a VLAG port channel status or an orphan port status changes.

In one or more embodiments, if a VLAG port channel goes up on a peer node, or an orphan port on the peer node is removed (315), it may determine whether (316) the egress drop rule has been installed on the node. And if not, the node installs (314) the rule and, thus, prevent needless traffic being send over the INL to the peer node. Otherwise, i.e., if the VLAG port channel on the peer node goes down, or an orphan port on the peer node is added (317), in response to determining (318) that the egress drop rule has been installed on the primary peer node, the rule may be removed (320) such as to allow BUM traffic to traverse the INL.

It shall be noted that: (1) certain steps may optionally be performed; (2) steps may not be limited to the specific order set forth herein; (3) certain steps may be performed in different orders; and (4) certain steps may be done concurrently. It should also be noted that steps of removing the egress rule (e.g., step 320) and/or the step of installing the egress rule (e.g., step 314) by be done by setting a flag or indicator at that stage and installing or removing during a processing phase (e.g., step 312). One reason for operating is such as manner is for optimization or efficiency if there are a number of rules that need to be installed and/or removed.

Figure 4:
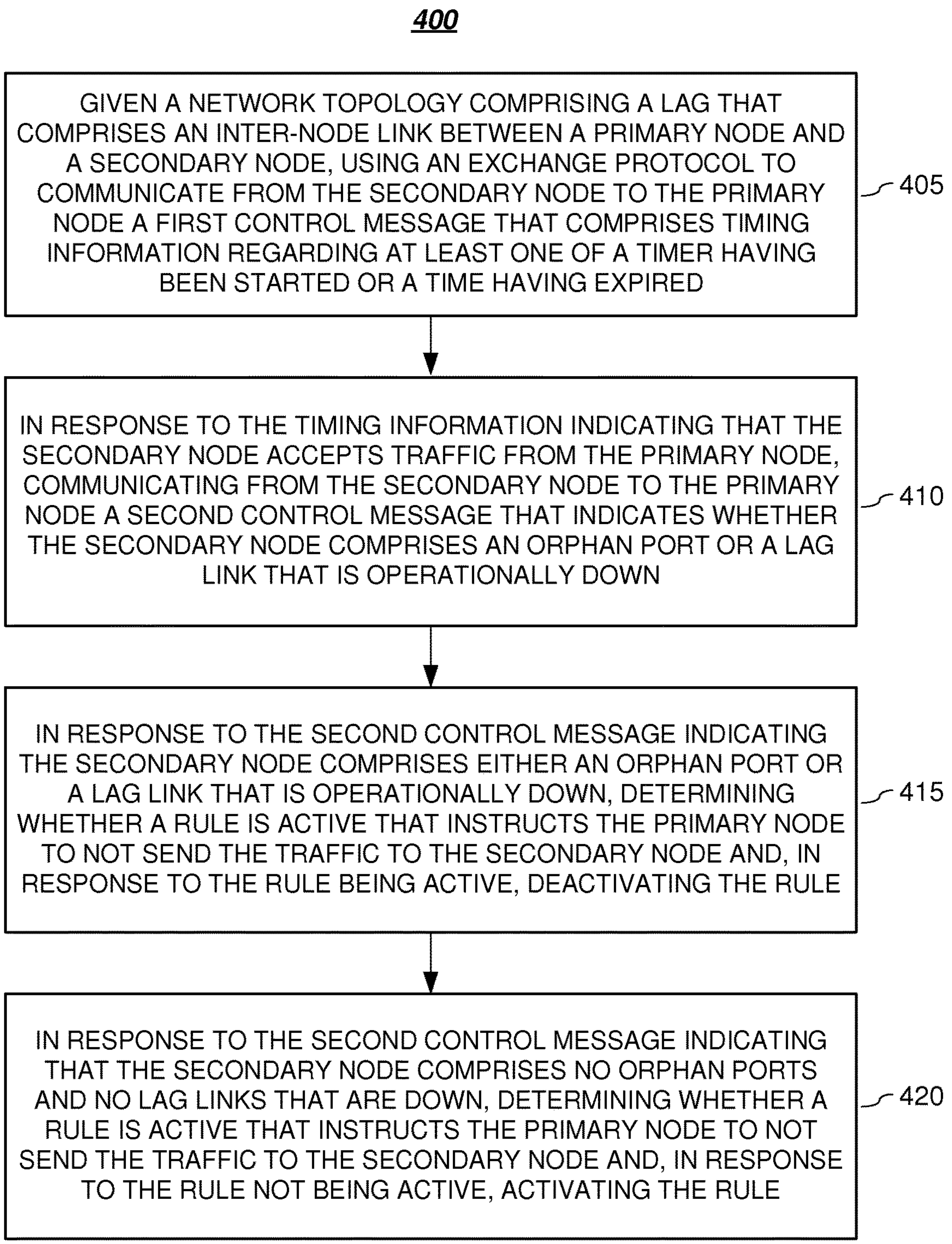
FIG. 4 is another exemplary flowchart illustrating a control process according to various embodiments of the present disclosure.

FIG. 4 is another exemplary flowchart illustrating a control process according to various embodiments of the present disclosure. In one or more embodiments, control process 400 comprises, given a network topology that comprises a VLAG that comprises an INL between a primary node and a secondary node, using an exchange protocol to communicate (405) from the secondary node to the primary node a first control message that comprises timing information regarding at least one of a timer having been started or a time having expired.

In one or more embodiments, if the timing information indicates that the secondary node accepts traffic from the primary node (e.g., the configuration timer has expired), a second control message, which indicates whether the secondary node comprises at least one of a LAG link that is operationally down or an orphan port, may be communicated (410) from the secondary node to the primary node.

In one or more embodiments, if the second control message indicates that the secondary node comprises either a LAG link that is operationally down or an orphan port, steps may be performed (415) comprising determining whether a rule, which instructs the primary node to not send the traffic to the secondary node, is active. In response to the rule being active, the rule may be deactivated.

Finally, if the second control message indicates that the secondary node comprises no LAG links that are operationally not functioning or has no orphan ports, steps may be performed (420) comprising determining whether the rule is not active; and if the rule is not active, the rule may be activated.

Figure 5:
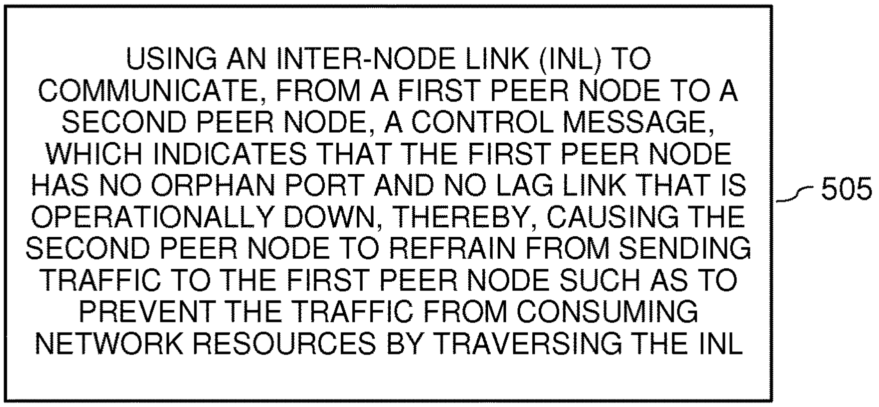
FIG. 5 is a simplified flowchart illustrating a control process according to various embodiments of the present disclosure.

FIG. 5 is a simplified flowchart of an illustrative control process according to various embodiments of the present disclosure. In one or more embodiments, control process 500 comprises using an INL to communicate (505), from a first peer node to a second peer node, a control message, which indicates whether the first peer node comprises an orphan port or a LAG link that is operationally down (i.e., not functional). If there are no orphan ports and no LAG links that are operationally down, the control message may cause the second peer node to install a rule not to send traffic, such as BUM traffic and other traffic, to the first peer node to prevent such traffic from unnecessarily traversing the INL and getting dropped at the first peer node, which wastes valuable network resources.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 6:
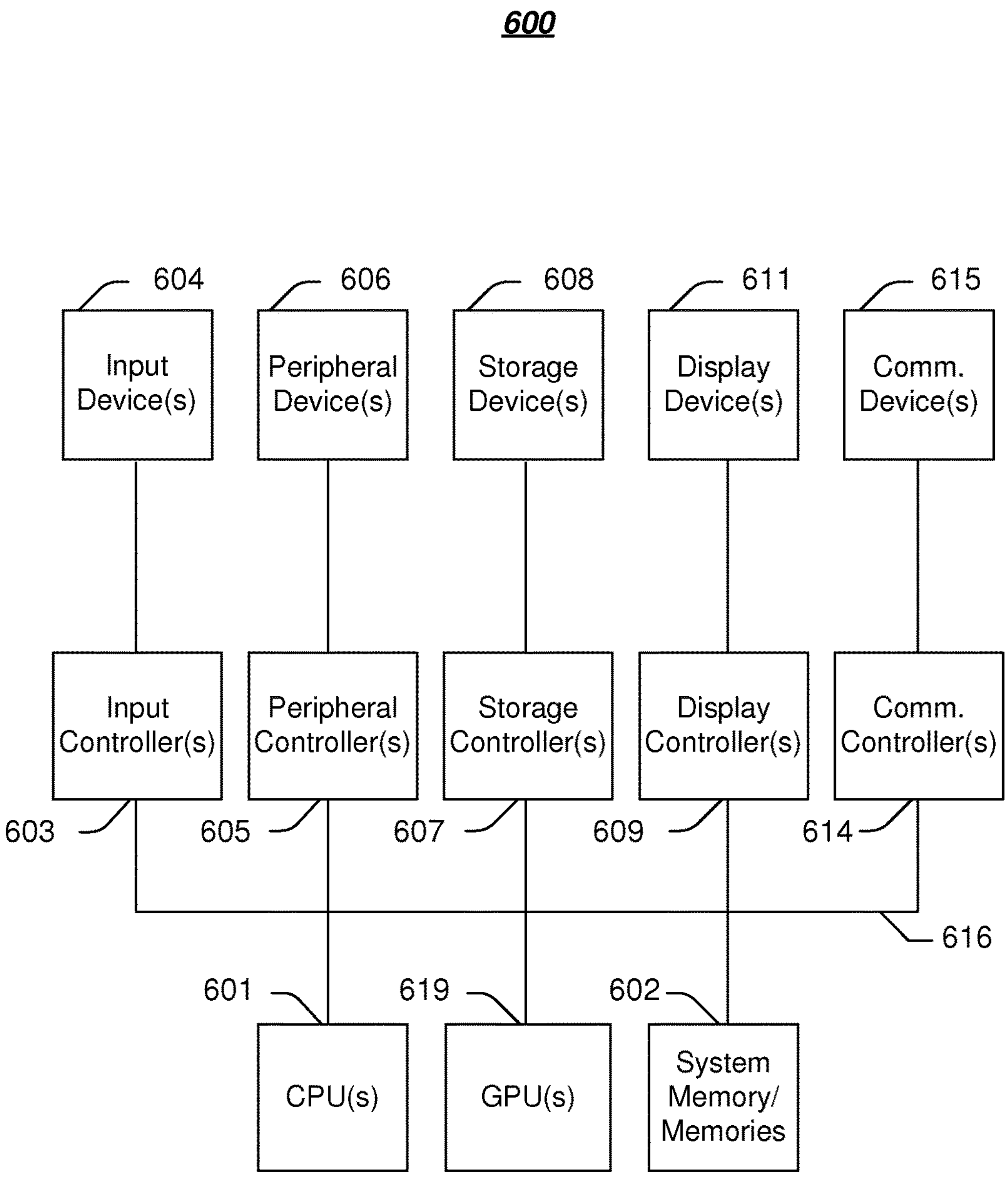
FIG. 6 depicts a simplified block diagram of an information handling system, according to embodiments of the present disclosure.

FIG. 6 depicts a simplified block diagram of an information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more CPUs 601 that provides computing resources and controls the computer. CPU 601 may be implemented with a microprocessor or the like and may also include one or more graphics processing units (GPU) 602 and/or a floating-point coprocessor for mathematical computations. In one or more embodiments, one or more GPUs 602 may be incorporated within the display controller 609, such as part of a graphics card or cards. The system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, stylus, microphone, camera, trackpad, display, etc. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 7:
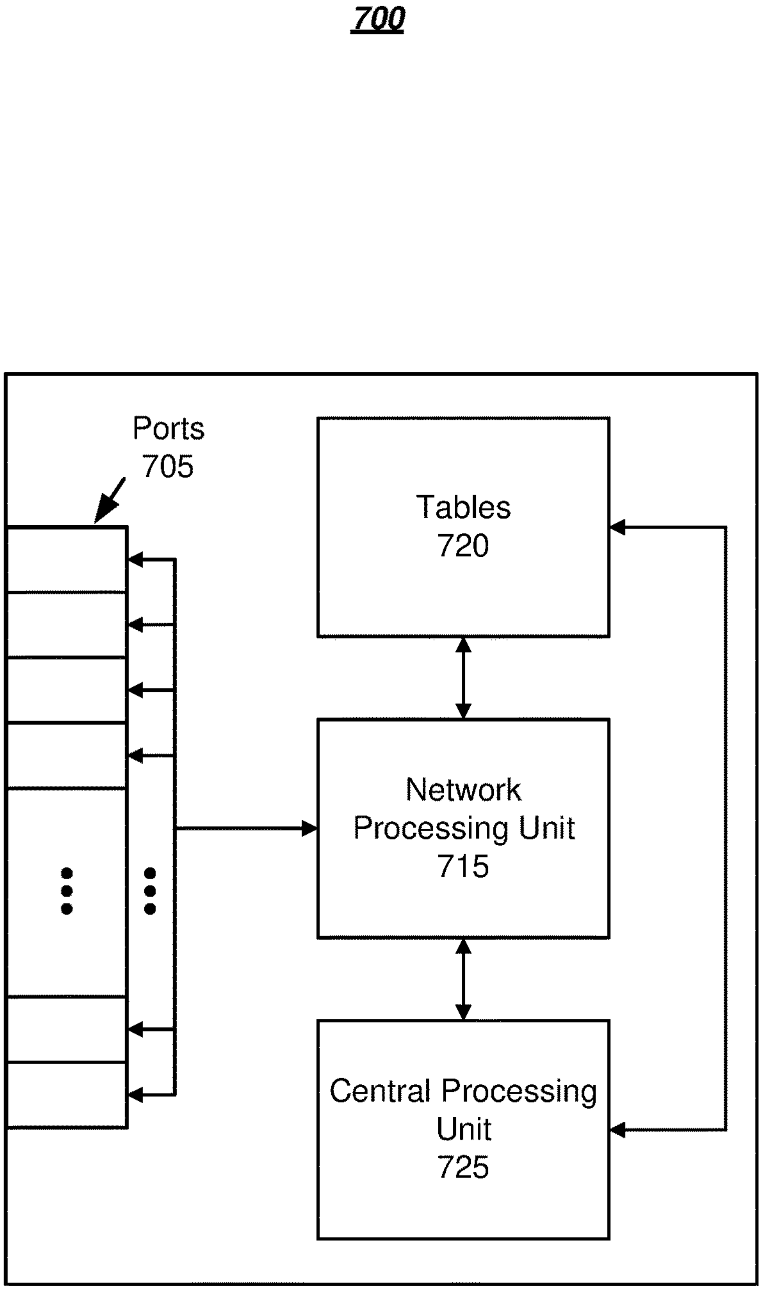
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure— although it shall be understood that such system may be differently configured and include different components, additional components, or fewer components.

The information handling system 700 may include a plurality of I/O ports 705, a network processing unit (NPU) 715, one or more tables 720, and a CPU 725. The system includes a power supply (not shown) and may also include other components, which are not shown for sake of simplicity.

In one or more embodiments, the I/O ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. An information-handling-system-implemented method for controlling traffic, the method comprising:

given a network topology comprising a virtual link trunking (VLT) or link aggregation group (LAG) (VLT/LAG) that comprises an inter-node link (INL) between a primary VLT/LAG peer node and a secondary VLT/LAG peer node:

receiving, from the secondary VLT/LAG peer node at the primary VLT/LAG peer node via the INL, a first control message sent by the secondary VLT/LAG peer node in response to the secondary VLT/LAG peer node undergoing a boot or reboot, in which the first control message comprises timing information indicating that the secondary VLT/LAG peer node is in a configuration time period during which the secondary VLT/LAG peer node is active but not yet configured to handle one or more types of traffic;

responsive to receiving the first control message indicating that the secondary VLT/LAG peer node is in the configuration time period, installing at the primary VLT/LAG peer node, if not already installed, a rule that instructs the primary VLT/LAG peer node to not send one or more types of traffic to the secondary VLT/LAG peer node via the INL;

responsive to the secondary VLT/LAG peer node no longer being in the configuration time period and responsive to receiving, from the secondary VLT/LAG peer node at the primary VLT/LAG peer node, a second control message that indicates that the secondary VLT/LAG peer node comprises at least one orphan port, performing steps comprising:

determining whether the rule that instructs the primary VLT/LAG peer node to not send one or more types of traffic to the secondary VLT/LAG peer node is active; and in response to the rule being active, deactivating the rule.

2. The information-handling-system-implemented method according to claim 1, wherein the one or more types of traffic comprises broadcast, unknown unicast, or multicast (BUM) data traffic.

3. The information-handling-system-implemented method according to claim 2, wherein the rule that instructs the primary VLT/LAG peer node to not send the BUM data traffic to the secondary VLT/LAG peer node further comprises also not sending identified control data.

4. The information-handling-system-implemented method according to claim 3, wherein the rule is an egress rule and the BUM data traffic and the identified control data have been tagged with one or more identifiers that identify the BUM data traffic and the identified control data to block or drop the BUM data traffic and the identified control data, using the egress rule, at egress processing at the primary VLT/LAG peer node.

5. The information-handling-system-implemented method according to claim 4, further comprising tagging the BUM data traffic and the identified control data using a class identifier as part of ingress processing at the primary VLT/LAG peer node.

6. The information-handling-system-implemented method according to claim 1, further comprising:

receiving, from the secondary VLT/LAG peer node at the primary VLT/LAG peer node via the INL, a control message that comprises information regarding the configuration time period having expired.

7. The information-handling-system-implemented method of claim 1, further comprising:

in response to a control message indicating the secondary VLT/LAG peer node comprises no VLT/LAG links that are operationally down and no orphan ports, performing steps comprising:

determining whether the rule that instructs the primary VLT/LAG peer node to not send one or more types of traffic to the secondary VLT/LAG peer node via the INL is active; and in response to the rule not being active, activating the rule.

8. The information-handling-system-implemented method according to claim 1, wherein the first control message instructs the primary VLT/LAG peer node to install the rule in the primary VLT/LAG peer node.

9. An information-handling-system-implemented method comprising:

determining at a first virtual link trunking (VLT) or link aggregation group (LAG) (VLT/LAG) peer node whether the first VLT/LAG peer node comprises at least one orphan port, in which the first VLT/LAG peer node is communicatively coupled with a second VLT/LAG peer node that participates in the VLT/LAG via an inter-chassis link (ICL); and in response to the first VLT/LAG peer node comprising no orphan ports, communicating, from the first VLT/LAG peer node to the second VLT/LAG peer node via the ICL, a control message that indicates to the second VLT/LAG peer node that the first VLT/LAG peer node does not possess any orphan ports, which triggers the second VLT/LAG peer node to not send one or more types of traffic to the first VLT/LAG peer node to prevent the one or more types of traffic from being dropped at the first VLT/LAG peer node.

10. The information-handling-system-implemented method of claim 9, further comprising:

in response to the first VLT/LAG peer node comprising at least one orphan port, communicating, from the first VLT/LAG peer node to the second VLT/LAG peer node, a control message that signals to the second VLT/LAG peer node that the first VLT/LAG peer node possesses at least one orphan port, which triggers the second VLT/LAG peer node to perform steps comprising:

determining whether a rule that causes the second VLT/LAG peer node to not send one or more types of traffic to the first VLT/LAG peer node via the ICL between the first VLT/LAG peer node and the second VLT/LAG peer node is active; and in response to the rule being active, deactivating the rule.

11. The information-handling-system-implemented method of claim 9, further comprising:

receiving, from the second VLT/LAG peer node at the first VLT/LAG peer node, a control message that signals to the first VLT/LAG peer node to not send one or more types of traffic to the second VLT/LAG peer node to prevent the one or more types of traffic from being dropped at the second VLT/LAG peer node;

determining whether a rule that causes the first VLT/LAG peer node to not send one or more types of traffic to the second VLT/LAG peer node via the ICL between the first VLT/LAG peer node and the second VLT/LAG peer node is active; and in response to the rule not being active, installing the rule.

12. The information-handling-system-implemented method of claim 11, further comprising:

responsive to receiving, from the second VLT/LAG peer node at the first VLT/LAG peer node, a message that indicates to the first VLT/LAG peer node that the second VLT/LAG peer node comprises an orphan port, performing steps comprising:

determining whether the rule that causes the first VLT/LAG peer node to not send one or more types of traffic to the second VLT/LAG peer node via the INL ICL between the first VLT/LAG peer node and the second VLT/LAG peer node is active; and in response to the rule being active, deactivating the rule.

13. The information-handling-system-implemented method according to claim 9, wherein the one or more types of traffic comprises broadcast, unknown unicast, or multicast (BUM) data traffic and at least some control data traffic.

14. The information-handling-system-implemented method according to claim 13, wherein the BUM data traffic and the at least some control data traffic have been tagged with one or more identifiers that identify the BUM data traffic and the at least some control data traffic to block or drop the BUM data traffic and the at least some control data traffic, according to an egress rule, at egress processing at the second VLT/LAG peer node.

15. The information-handling-system-implemented method of claim 9, further comprising:

communicating, from the first VLT/LAG peer node to the second VLT/LAG peer node, a message comprising boot or reboot timing information that signals to the second VLT/LAG peer node to not send one or more types of traffic to the first VLT/LAG peer node to prevent the one or more types of traffic from being dropped at the first VLT/LAG peer node due to the first VLT/LAG peer node being in a configuration time period during which the first VLT/LAG peer node is active but not yet able to handle one or more types of traffic.

16. The information-handling-system-implemented method of claim 9, further comprising:

receiving, from the second VLT/LAG peer node at the first VLT/LAG peer node, a message comprising boot or reboot timing information that signals to the first VLT/LAG peer node to not send one or more types of traffic to the second VLT/LAG peer node to prevent the one or more types of traffic from being dropped at the second VLT/LAG peer node due to the second VLT/LAG peer node being in a configuration time period during which the second VLT/LAG peer node is active but not yet able to handle one or more types of traffic.

17. An information handling system comprising:

at least one port for connecting with a peer virtual link trunking (VLT) or link aggregation group (LAG) (VLT/LAG) node via an inter-node link (INL);

one or more ports;

one or more processors; and a non-transitory computer-readable medium or media comprising one or more sets of instructions which, when executed by at least one of the one or more processors, causes steps to be performed comprising:

in response to the information handling system comprising no orphan ports, communicating to the peer VLT/LAG node via the INL a message that indicates to the peer VLT/LAG node that the information handling system comprises no orphan ports, which triggers the peer VLT/LAG node to not send one or more types of traffic to the information handling system; and in response to the information handling system comprising at least one orphan port, communicating to the peer VLT/LAG node a message that indicates to the peer VLT/LAG node that the information handling system comprises at least one orphan port, which triggers the peer VLT/LAG node to perform steps comprising:

determining whether a rule that causes the peer VLT/LAG node to not send one or more types of traffic to the information handling system via the INL is active; and in response to the rule being active, deactivating the rule.

18. The information handling system of claim 17, wherein the non-transitory computer-readable medium or media further comprises one or more sets of instructions which, when executed by at least one of the one or more processors, causes steps to be performed comprising:

receiving, from the peer VLT/LAG node, a message that signals to the information handling system to not send one or more types of traffic to the peer VLT/LAG node;

determining whether a rule that causes the information handling system to not send one or more types of traffic to the peer VLT/LAG node via the INL is active; and in response to the rule not being active, installing the rule.

19. The information handling system of claim 17, wherein the non-transitory computer-readable medium or media further comprises one or more sets of instructions which, when executed by at least one of the one or more processors, causes steps to be performed comprising:

responsive to receiving, from the peer VLT/LAG node, a message that indicates to the information handling system that the peer VLT/LAG node comprises an orphan port, performing steps comprising:

determining whether the rule that causes the information handling system to not send one or more types of traffic to the peer VLT/LAG node via the INL is active; and in response to the rule being active, deactivating the rule.

20. The information handling system of claim 17, wherein the one or more types of traffic comprises broadcast, unknown unicast, or multicast (BUM) data traffic and at least some control data traffic.

* * * * *